United States Patent [19]
LaHaye et al.

[11] Patent Number: 6,035,644
[45] Date of Patent: Mar. 14, 2000

[54] TURBINE CONTROL VALVE

[75] Inventors: Paul G. LaHaye, Kennebunk; Wendell C. Drown, Old Orchard Beach; John L. Seger, Portland, all of Me.

[73] Assignee: HPS Merrimac, Kennebunk, Me.

[21] Appl. No.: 09/024,755

[22] Filed: Feb. 18, 1998

Related U.S. Application Data

[63] Continuation of application No. 08/986,246, Dec. 5, 1997
[60] Provisional application No. 60/038,233, Feb. 19, 1997.

[51] Int. Cl.[7] .................................................. F01K 25/02

[52] U.S. Cl. ............................................. 60/683; 137/605

[58] Field of Search .............................. 60/650, 664, 683, 60/682; 137/605, 625.32

[56] References Cited

U.S. PATENT DOCUMENTS

| | | | |
|---|---|---|---|
| 4,471,809 | 9/1984 | Thomsen et al. | 137/625.32 |
| 4,475,343 | 10/1984 | Dibelius et al. | 60/682 X |
| 4,649,955 | 3/1987 | Otto et al. | 137/625.32 X |
| 4,761,957 | 8/1988 | Eberhardt et al. | 60/650 |
| 5,180,278 | 1/1993 | Warner | 60/682 X |
| 5,287,889 | 2/1994 | Leinen | 137/623.32 X |

FOREIGN PATENT DOCUMENTS 1554074  10/1979  United Kingdom .

*Primary Examiner*—Hoang Nguyen
*Attorney, Agent, or Firm*—Wolf, Greenfield & Sacks, P.C.

[57] ABSTRACT

A combustion gas turbine control valve for regulating the inlet temperature of an indirect fired gas turbine at the turbine expander inlet and is useful in indirect fired gas turbine power generation systems.

23 Claims, 9 Drawing Sheets

TURBINE CONTROL VALVE

Priority is claimed from USA provisional application No. 60/038,233 filed Feb. 19, 1997 which is incorporated by reference herein in its entirety. This application is a continuation of U.S. Ser. No. 08/986,246 filed Dec. 5, 1997.

This invention was made with government support under contract number DE-FC21-90MC26008 and DE-AC21-94MC31327 awarded by the U.S. Department of Energy. The government has certain rights in the invention.

BACKGROUND OF THE INVENTION

1. Field of the Invention

The present invention relates to a combustion gas turbine control valve and more particularly, to a combustion gas turbine control valve for regulating the inlet temperature of an indirect fired gas turbine at the turbine expander inlet, useful in an indirect fired gas turbine power generation system.

2. Description of the Related Art

In a conventional open cycle gas turbine, a cycle compressor raises the pressure of air from the atmosphere to a higher pressure and delivers this higher pressure to a combustion chamber to be mixed with a fossil fuel which is burned. The resulting high pressure, high temperature products of combustions are expanded through a turbine expander to drive a load such as an electric generator and the previously mentioned cycle compressor, used to compress the atmospheric air for the cycle.

A prior art power generation combined cycle system is shown in FIG. 1 at 10. In this system an ambient air stream of atmospheric air 12 is directed to a compressor portion 14 of a gas turbine, having a rotating shaft linking portion 14 with turbine expander 18, wherein the temperature and pressure of the air are increased by the compressor portion 14, from atmospheric to from about 60 to 600 psia and a temperature of from about 200° F. to about 1200° F. The high pressure stream of air then leaves the compressor portion 14 through passage 15 and passes to one or more combustors at 101 wherein a fossil fuel is added and burned thus increasing the temperature of the constituents in the gas stream or generally referred to as the products of combustion. The hot products of combustion at 17 are delivered to the inlet of the turbine expander 18. The turbine expander 18 drives the cycle compressor 14 and an electric alternator temperature of the constituents in the gas stream or generally referred to as the products of combustion. The hot products of combustion at 17 are delivered to the inlet of the turbine expander 18. The turbine expander 18 drives the cycle compressor 14 and an electric alternator 20 which produces electric power 222. The turbine exhaust gases 24 can be directed to a steam generator 36 and the steam thus generated is used to drive a steam cycle which includes a steam turbine 25. The steam turbine in turn drives an alternator that produces additional electric power. When a steam cycle is added, the power cycle is referred to as a "combined cycle".

In the embodiment shown, the turbine exhaust gas 24 passes through a steam generator 36 producing steam that is expanded through a steam turbine 25 to produce additional electric power before being discharged to the atmosphere.

In prior art cycles, the quantity of electric power generated by the cycle is controlled by modulating the fuel flow to the combustor 101, thus changing the temperature of the inlet gas stream into the turbine expander 18 from full fuel energy input to the machine to zero energy input in 100 milliseconds or less. Thus, permitting full control of the rotational speed of the gas turbine.

SUMMARY OF THE INVENTION

It is an object of this invention to provide a turbine control valve for regulating the inlet gas temperature to the expander portion of a gas turbine in an indirect fired cycle. This value is needed to adopt to the thermal inertia of the machine which is sufficiently high as to make control of the rotational speed by modulating the fuel input, inadequate. By adjusting the proportions of cold air and heated air, the valve produces a gas stream at the desired temperature to the turbine expanded within the time constraints imposed by the physical and thermal characteristics of the gas turbine preferably less than 100 milliseconds. In addition, the control valve is configured to use the pressure drop in the valve to mix the two fluids in an optimum fashion for delivery to the turbine expander.

Another object of this invention to provide a turbine control valve which can maintain a constant temperature at the expansion inlet of a turbine expander as required to carry a desired load as well as permit variation in desired temperature to vary the load.

It is a feature of this invention that the inlet temperature of the expansion section of the turbine can be modulated by mixing relatively cool compressor discharge air with heated air by means of a series of openings in a liner and sleeve for obtaining desired temperature. Blended compressor cool discharge air and heated air can provide an optimum temperature profile at the turbine expander inlet. An optimum temperature profile at the turbine expander inlet allows obtaining maximum power output from the expansion turbine consistent with reasonable service life and safe operation of the turbine. The turbine can be shut down or the cycle "dumped" in case of an emergency by using the valve of this invention to direct the colder compressor discharge air into the expander inlet while restricting flow of heated air. All the desired functions of the valve can be obtained with a minimum pressure drop through the valve consistent with avoiding instabilities in the operation of the cycle. A supplementary fuel combustor can be integrated into the turbine control valve to boost the temperature of air delivered by an air heater or to start the operation. The pressure drop of the supplementary combustor serves the dual purpose of mixing supplementary fuel with air from the heater for combustion and diluting the resulting products of combustion with air from the heater to the desired temperature level at the entrance of the turbine control valve where the modulating dilution flow of air from the cycle compressor can control the temperature at the entrance to the turbine expander.

According to the invention, a turbine control valve for regulating the inlet temperature of a turbine expander is provided with liner having a plurality of first openings and a gas mixing passageway. A sleeve is positioned around the liner and has a plurality of second openings corresponding to the first openings in the liner. A cool air inlet and a heated air inlet to the turbine control valve are provided. A first outlet for passing mixed heated and cool air to a turbine expander inlet is provided. The liner is movably mounted with respect to the sleeve such that openings in the liner and sleeve can be aligned as required to mix and proportion cool air from the cool air inlet with heated air from the heated air inlet to regulate the turbine expander inlet gas temperature and to provide a predetermined optimum temperature profile to said third outlet. Gas at a predetermined, uniform, average temperature can be provided to the first outlet. Preferably, the sleeve is rigid and the liner is flexible so that the liner will conform to the sleeve as to prevent binding of the sleeve and liner with respect to each other in the event that the assembly is not uniformly heated in operation causing thermal distortion of the components. More preferably, the sleeve and liner are concentric, axially aligned and the liner rotates within the rigid sleeve. Preferably the cool air inlet temperature is between 200° F. and 1200° F. and the heated air inlet temperature is between about 1500° F. and about 2800° F. In another embodiment a second sleeve is positioned around and attached to the rigid sleeve defining an annular space between the sleeves for passage of relatively cool compressor discharge air to avoid overheating of the valve parts. This annular space cooling air passes to the supplementary combustor where it enters the combustor as primary combustion air.

In the most preferred embodiment an externally fired combustion cycle is provided with the turbine control valve as stated above.

According to a method of this invention, the inlet air temperature to the expander portion of the turbine is varied between about 800° F. to about 2750° F. by providing a turbine control valve which is itself provided first with a cool air source from the cycle compressor at a first temperature in the range of about 200° F. to 1200° F. at a first pressure in the range of 60 psia to about 600 psia and second with a heated air source at a temperature in the range of from about 1500° F. to about 2800° F. and a second pressure that is slightly below the pressure of the cool air source generally 2 to 10 percent lower as for example at an absolute pressure of about 50 psia to 588 psia A higher pressure is maintained in the cool air then maintained in the heated air. The cool and heated air are intermixed by the use of a pressure drop between the two to obtain rapid, efficient and uniform mixing to form a combined air stream having the desired average temperature and temperature profile. The combined air stream with the predetermined average temperature is passed to the turbine expander. An increase or decrease in average temperature increases or decreases the energy output from the turbine expander to accommodate a desired level or load.

According to the method of this invention a turbine may be maintained at essentially constant speed while the turbine expander inlet air temperature can vary to allow for varying the load as would be the case when the load is a synchronous alternator and the gas turbine has a single rotating shaft between the expander, the compressor and the alternator.

The invention will also serve to control the turbine expander rotation speed through a wide range to accommodate load devices such as process compressors when the load is primarily a function of rotational speed and other similar applications.

The indirect fired cycle thermal efficiency is affected by the pressure drop between the cycle compressor through the air heater and the control valve to the turbine expander. The higher the pressure drop, the lower the cycle thermal efficiency. The control valve represents ¼ to ½ of this pressure drop. It is essential if high cycle efficiencies are to be attained that the pressure drop be at a minimum.

The gas turbine inlet temperature is maintained constant by adjusting the proportion of heated air to cool air mixed in the control valve prior to the turbine expander inlet by the use of a circular, close fitting sleeve having a liner, with the sleeve and liner having aligned openings capable of being rotated to fully opened positions, fully closed positions and intermediate positions whereby the ratio of heated air to cold air can be adjusted using a pressure differential between the heated and cooled air to uniformly and rapidly mix the heated and cold air.

Preferably, the heated air having a lower pressure is passed axially through the liner and higher pressure cooler air is admitted through the radial openings which are positioned about a 360° circumference of the liner which is cylindrical. This provides jets of high pressure from the outside of the liner toward the axially moving stream of lower pressure hot air. These jets penetrate to the center of the hot gas stream moving within the liner thus mixing with the axial stream to maintain a uniform continuous and well mixed a gas stream. Preferably the lower pressure air is hot in the sleeve and the higher pressure air is cool cycle compressor discharge air with a pressure difference between the two of at least 2 to 10 percent of the absolute pressure level. By using the openings to pass gas into a moving gas stream axially moving within the liner, it is possible to obtain thorough, efficient, continuous, homogenous mixing of the cold and heated air to obtain a uniform temperature with a minimum pressure loss in a rapid, efficient manner.

DESCRIPTION OF THE DRAWINGS

The above and other objects and advantages of the present invention will be better understood from the following specification when read in conjunction with the accompanying drawings in which.

DESCRIPTION OF DETAILED EMBODIMENT

Figure 1:
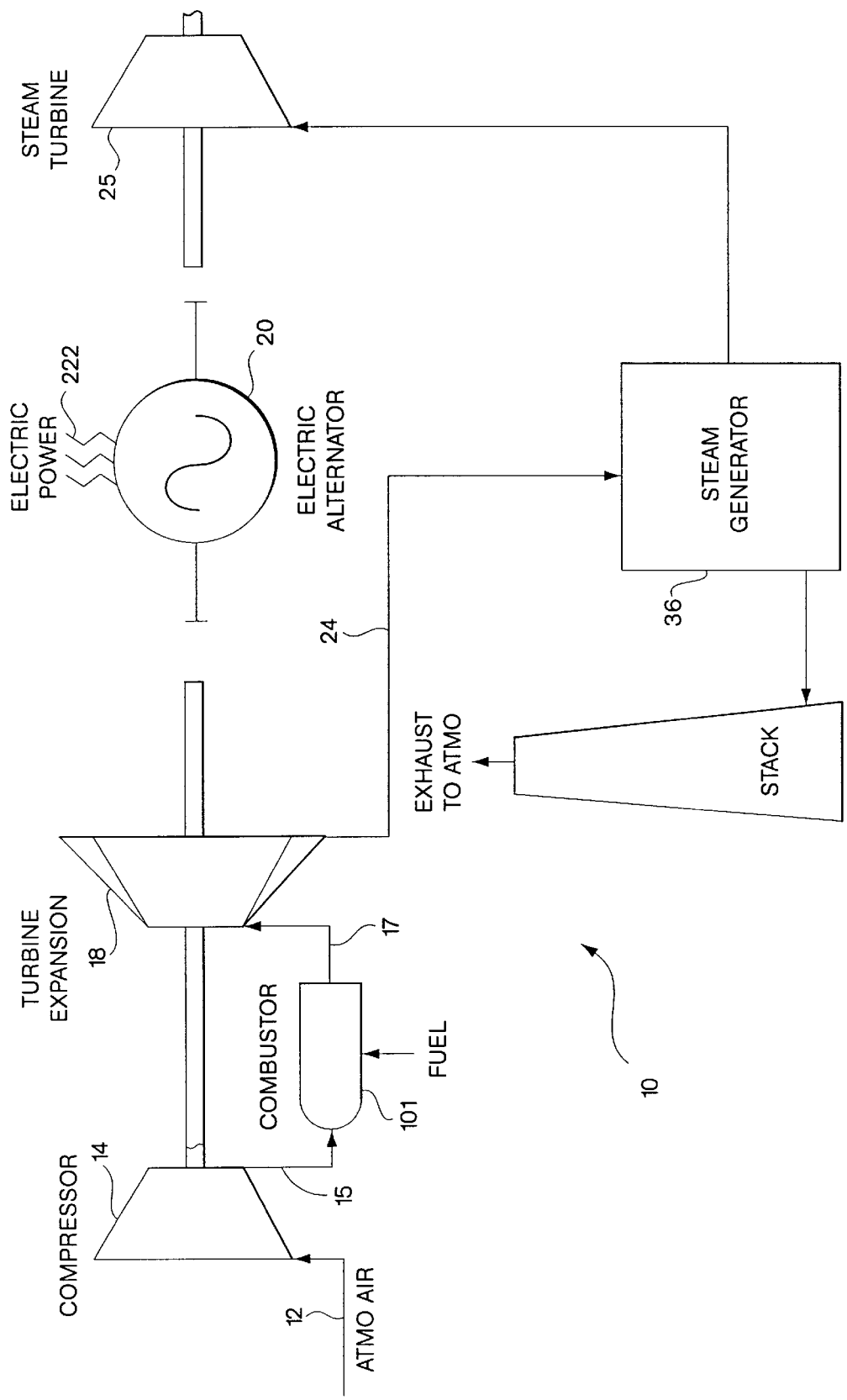
FIG. 1 is a schematic illustration of a prior art process flow diagram of a power generation system.
Figure 2:
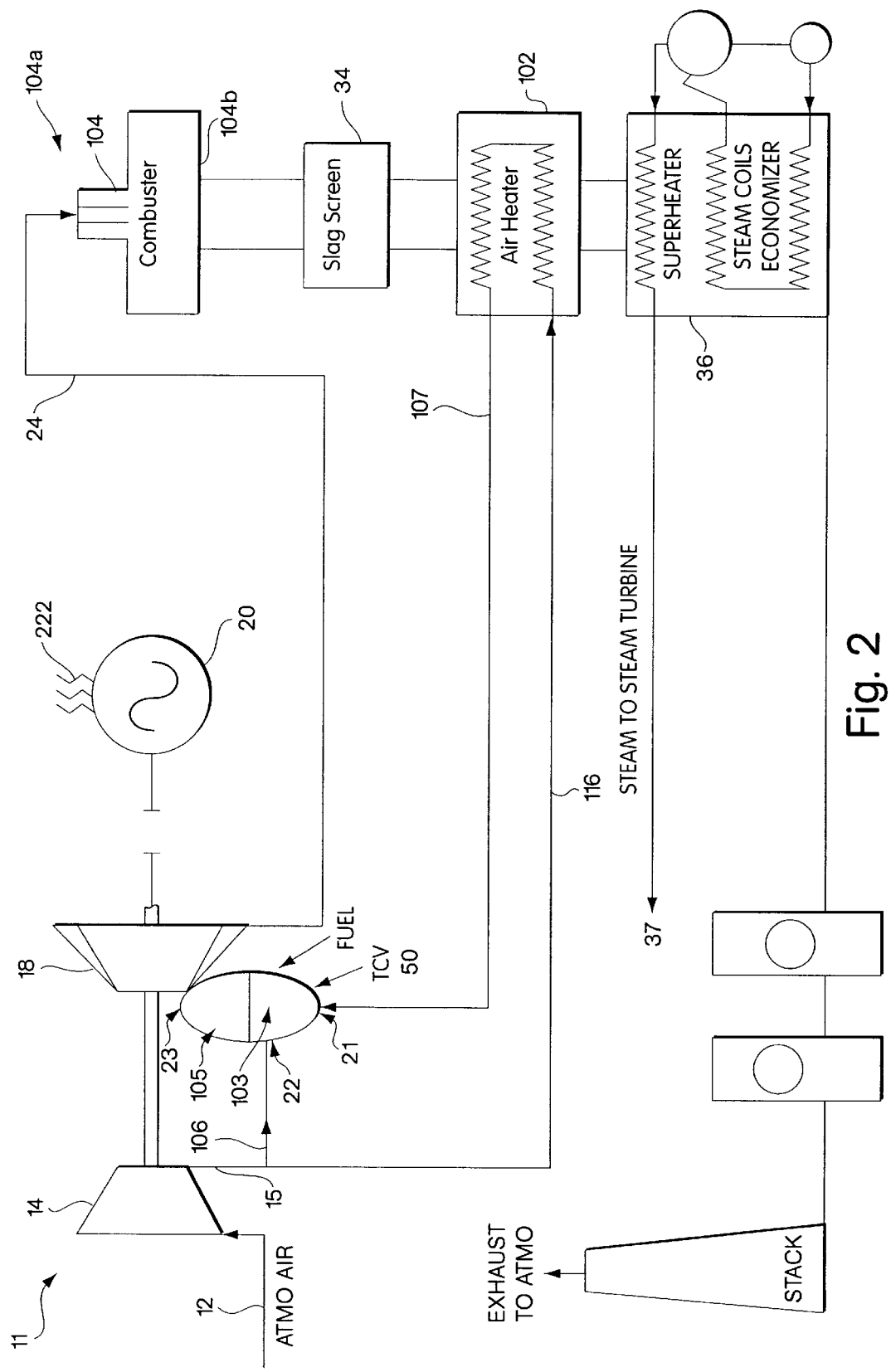
FIG. 2 is a diagrammatic illustration of a process flow diagram of FIG. 1 incorporating the turbine control valve of the present invention in an indirect fired power cycle.

FIG. 2 shows a diagrammatic layout of an indirect fired power cycle 11 having the improved turbine control valve (TCV) 50 of this invention. The cycle 11 of FIG. 2 is generally similar to FIG. 1 but includes the additional structure of the turbine control valve, air heater 102, external combustor 104 and associated lines for carrying heated and cool compressed air. Thus, the power cycle 11 receives atmospheric air at 12 passing to a compressor section 14 and having a turbine expander section 18 and coupling shaft linking the compressor and expander sections of the gas turbine. Compressed air from the compressor section at a pressure of from 60 to 600 psia is passed through pipe or line 15 and 116 at a temperature of 200° F. to 1200° F. to an air heater 102. Fuel is added at a burner 104a that is mixed with turbine expander exhaust air 24 and burned in a chamber 104b to form products of combustion in a temperature range of 1650° F. to 3200° F. The products of combustion flow through the air heater 102 transferring thermal energy to the cycle compressor discharge air from line 116 heating this air to a temperature above the desired temperature at the turbine expander inlet and in the range of 1500 to 2800° F. On leaving the air heater, the products of combustion pass through steam coils 36 to generate steam which can power a steam turbine 37 driving an alternator to produce additional electric power as in the embodiment of FIG. 1. Finally, the products of combustion are exhausted through a stack as shown.

The air heater 102 can be composed of metallic heat transfer tubes or can be composed of ceramic heat transfer tubes as is known in the art. The relatively cool compressor discharge air enters the air heater through line 15–116 and is heated in 102 coming out through line 107 at a temperature of from 1500° F. to 2800° F. and a psi of from 58 to 594. The heated air passes to the heated air inlet 21 of a turbine control valve (TCV) 50 while relatively cool air passes through line 106 at 200° F. to 1200° F. and from 60 to 600 psia to a cool air inlet 22 of the turbine control valve 50. A supplementary combustor 103 can be provided in the turbine control valve. Mixed air from lines 106 and 107 respectively are provided at 105 passing to a turbine expander inlet 23 of the turbine expander 18 wherein the uniform admixed air enters the turbine as described.

The expander 18 has an exhaust line 24 leading back to the external combustor 104 where some exhaust air is used to burn the fuel 104a in the combustor 104 of combustion chamber 104b.

The turbine control valve 50 comprises a sleeve and a liner movable within the sleeve. Preferably axially aligned openings in the liner and corresponding with openings in the sleeves are provided so that they can be rotated into opened and closed positions to mix and proportion cool air from the cool air inlet 22 and heated air from the heated air inlet 21 to regulate the turbine inlet gas temperature at 23 to provide a predetermined uniform average temperature at the inlet 23 to the turbine expander. Axial rather than rotational movement of the liner within the sleeve may also be used to modulate the flows of the hot and cold air. Because a pressure drop of from 2 to 10 percent is maintained between the heated and cooled air, the cooled air can be drawn into the lower pressure heated gas stream to get uniform, efficient mixing and obtain a uniformly heated desired temperature air stream as will be further described. A combustor 104 at the top of chamber 104b can receive ash bearing fuel which is burned in the air stream 24 for providing thermal energy to the air heater and steam coil. A slag screen 34 can be provided at the discharge of chamber 104b to remove ash particles from the heated gas passing to the air heater and steam coils to prevent clogging of these devices with ash.

The cycle described above is an EFCC or externally fired combined cycle.

Figure 3:
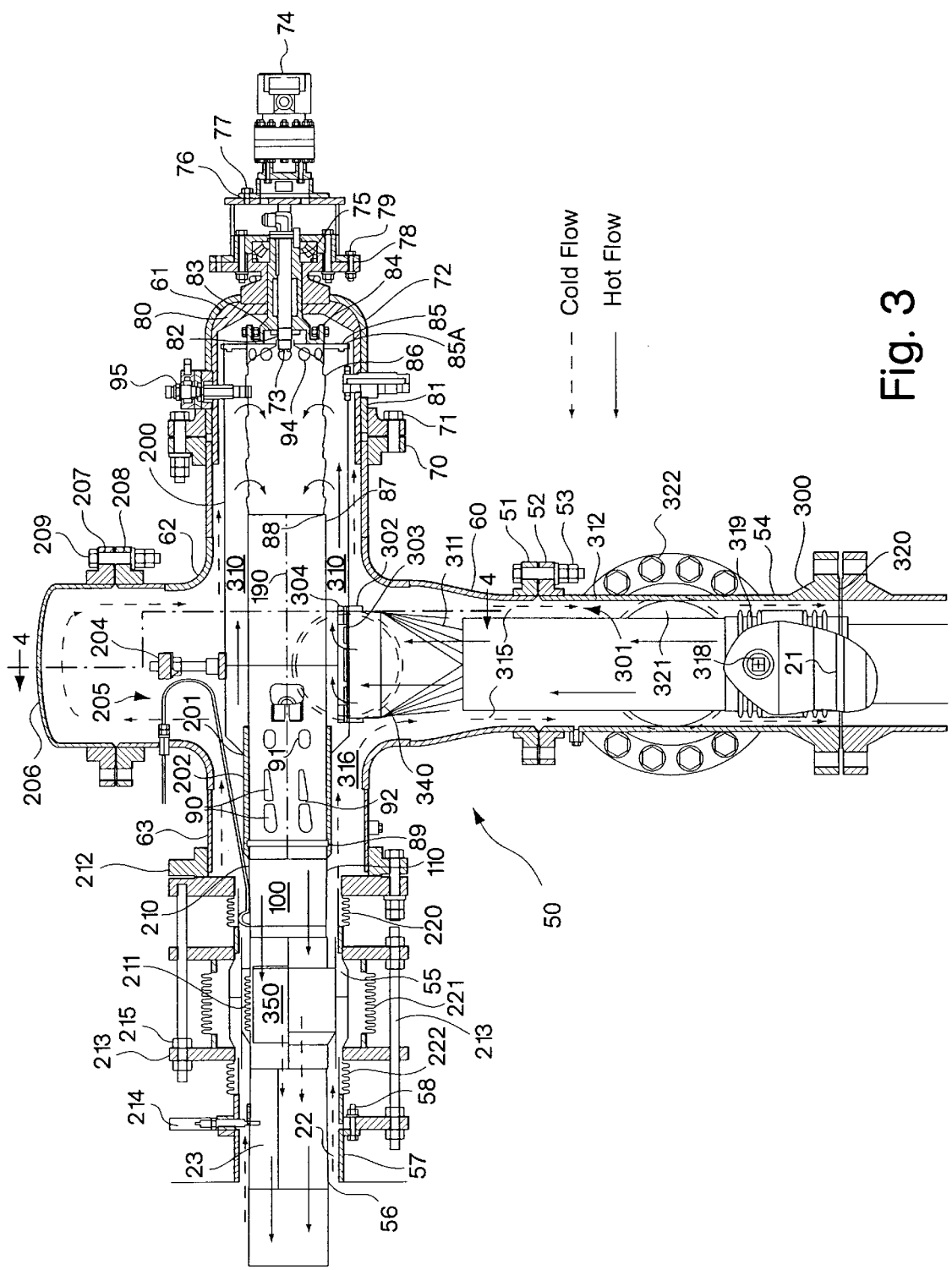
FIG. 3 is a semi-diagrammatic cross-sectional view through the center line of a turbine control valve connected to a heat exchanger hot header connector at a first flange which connector is shown partially in cross-section and at a second flange to a turbine control connector section shown partially in cross section which section acts as a pressure compensation expansion joint section.

Turning now to a specific embodiment, a preferred turbine control valve of this invention is shown at 50 in FIG. 3 interconnected through suitable circular flanges 51 and 52 by bolts 53 to a heat exchanger connecting piping 54 and a turbine flexible connector section 55 which acts as a pressure compensated expansion joint attached to a turbine, not shown, attached to an existing turbine inner cylindrical liner 56. The turbine has an outer cylindrical casing 57 attached by bolts 58 to the flexible connector section 55.

The turbine control valve 50 has an overall cross-section shape determined by circular casing portions 60, 61, 62 and 63. The walls of circular portions 60, 61, 62 and 63 are preferably made of temperature resistant metals such as low alloy steel materials known in the art for temperature applications of this type.

The cross-sectional shape of the outer turbine control valve casing provides circular flanged ends 51 as previously described, circular flanged ends 70 for interconnection by bolts 71 to a combustor and turbine control valve actuator assembly 72. The assembly 72 comprises a fuel injector 73 of known standard construction and a hydraulic, pneumatic or electrical rotary actuator 74. The rotary actuator can be of standard construction as known in the art. A Textron hydraulical rotary actuator obtained from Micro-Precision Operations, Inc. company of Berne, Indiana is preferably used.

The rotary actuator 74 has a central shaft 75 linked through a circular stationary mounting flange and bolt arrangement 76, 77 to a circular flange and bolt arrangement 78, 79 to the casing portion 61 or 81. Thermal insulation can be provided at 80 around the end at the actuator to thermally insulate the actuator to some extent. The actuator rod or shaft 75 is linked at an end 82 and fixed to a combustor circular collar 83 which combustor collar 83 is linked at bolts 84 through a circular flange seal 85 comprising a flange portion 85a fixed on a combustor liner tube 86. The combustor tube 86 has a diameter of approximately 6 inches for one application and is preferably formed of high temperature alloy such as Hastalloy, Inconel, or the like. Tube combustor liner 86 rotates in response to activation of the rotary actuator 74, preferably through angles of from 0–32° about the central axis 190 of the turbine control valve. The central axis 190 extends through the turbine control valve. The combustor sleeve 86 is fixed to a cylindrical liner 87 as will be more fully described with respect to a surrounding sleeve. Basically, the liner 87 is mounted for rotation about the axis 190 along with the combustor liner 86 and has a first end 88 attached to the combustor liner 86 and a second end 89 which is floating in the turbine control valve sleeve. This liner 87 is mounted for incremental rotation as will be described. The liner is preferably formed of Chromium Nickel alloy such as Atek X obtained from Rolled Alloys of Temperance, Mich.

The liner 87 has a plurality of openings 90, 91. Holes or openings 91 are preferably generally oblong, while holes or openings 90 are preferably tear shaped with an intervening strengthening ribs 92 interrupting the tear shape. In the preferred embodiment, seven holes 91 and seven tear dropped holes 90 are spaced about the circumference of the circular liner 87 uniformly with the seven holes 91 having a total opened area of approximately 9.0 inches in one embodiment when the diameter of the liner is about 6 inches and holes 90 have a total area of approximately 25.5 inches. The overall length of the liner from end 88 to end 89 is approximately 30 inches and the combustor liner 86 to which it is attached has an overall axial length of approximately 16 inches. The combustor liner 86 is well known to those familiar with the art of gas turbine combustion liner design. It is provided with two or more series of circular openings or holes 94 extending entirely around the circumference of the circular liner to sustain combustion of the fuel introduced by the fuel injector 73. Only one series of holes illustrated at 94 in the drawings. A combustor igniter 95 of conventional design extends through the outer casing to a combustion zone within the supplementary combustor to provide ignition of the fuel air mixture in the liner to initiate the combustion process The igniter passes through an arc opening in the combustor liner and a shield not shown so that rotation of a liner is permitted without allowing air in the annular space 310 from passing through the arc opening into the combustion liner 86.

An inner stationary casing 200 is circular along its axial length about the central axis 190 and is formed of a high temperature metal alloy. This inner casing has an end 201 at the left hand side of the drawing welded to the turbine control valve sleeve 202 and rotates in a circular seal flange at 85*a* fixed at the right hand and of combustor liner tube 86. The end 201 is fixed to the valve sleeve which sleeve 202 acts in conjunction with the liner 87. The sleeve 202 is preferably a rigid, circular tube carrying matching openings 90*a* and 91*a*, corresponding to openings 90, 91 in the liner 87. The sleeve is maintained in rigid fixed position about the liner 87 by rigid attachment to the cylindrical inner casing at 201 which in turn is mounted and rotationally fixed within the outer casing by a bracket assembly 204 attached to the outer casing by welding not shown. A conventional static sensor pressure 205 can be used if desired to measure the static gas pressure within the turbine control valve. A cylindrical closed end cap 206 is mounted about the circular opening at flanges 207, 208 by bolts 209 to give access for assembly and disassembly of the turbine control valve.

The rigid sleeve 202 is fixed at its left hand end as shown in FIG. 3 to a continuation of the inner casing at a circular axially aligned portion 210 which is in turn interconnected with a conventional pressure compensated expansion joint comprising for example an inner convoluted tubular bellows 211 in turn interconnected to the turbine liner 56 of a gas turbine not shown. The turbine pressure compensated flexible connector section 55 comprises the expansion joint arrangement 211, 220, 221 and 222 connected with bolts and with flanges 212, 214, and the sliding nut and rod assembly 215 and 213 contains the blow out force of the internal pressure as known in the art. The pressure compensating portion of the outer casing thus comprises the tubular outer casing with the pressure compensator comprising members 215, 213, 214, 222, 221 and 220 which are connected through bolts 58 to the turbine casing 57.

Expansion bellows 220, 221, 222 are conventional convoluted tubular axially aligned expansion bellows which provide for expansion and contraction of the outer casing and joints as known in the art. The inner expansion bellows 211 is partially shown in FIG. 3 and is in fact axially aligned with the central axis 190 with only the top half being shown in FIG. 3. This bellow 211 serves to adsorb the differential thermal expansion between the inner casing 200, the sleeve 202, the liner section 110 and three anchor pins in flange 214, and the outer casing 63 and the flexible connector.

The outer casing 60 is attached to the flange 51 and to flange 52 of the turbine air heater connection which comprises piping going to and returning from the gas turbine air heater. Hot air enters at circular flange 300, from the heat exchanger, through inner coaxial pipe 301 which is connected through a flange diagrammatically shown at 302 through a rectangular opening 303 having a rectangular port not shown in wall 304 for gas passage. The rectangular opening 303 connects to a central annular shaped passageway 310 formed by the inner liner 87 and the inner casing 200. The pipe 301 has an axis perpendicular to the axis 190 of the inner casing. Thus there is a transition at 311 from a circular pipe to a rectangular cross-section at 303. The pipe 301 has a diameter less than the diameter of outer heat exchange connector section 312 and the turbine control valve outer casing 60 providing for an annular passageway 315 interconnecting with annular passageway 316 of the turbine control valve and an inlet port 22 through an annular opening from which (relatively) cool air from the compressor section of the gas turbine flows into the turbine control valve assembly.

An access plug 318 is provided for access to an expansion joint assembly 319. The bellows in 319 is axially aligned with a central elongated axis of the piping 301 and fixed through a disc 320 to one end of the heat exchanger connector and to the joint 302. This expansion joint assembly is to absorb differential expansion and contraction between locating device 204 and flange 300. A circular opening 321 in the tee off piping 312 provides a passageway to the heat exchanger cold header for the flow of cool air entering at 22 to the air heater through opening 321 interconnected with passageway 315 through a flanged interconnection 322 as known in the art. Thus the outlet of the turbine control valve is found at 321 for air passing to the air heater while air is received from the air heater at an inlet 21.

Figure 4:
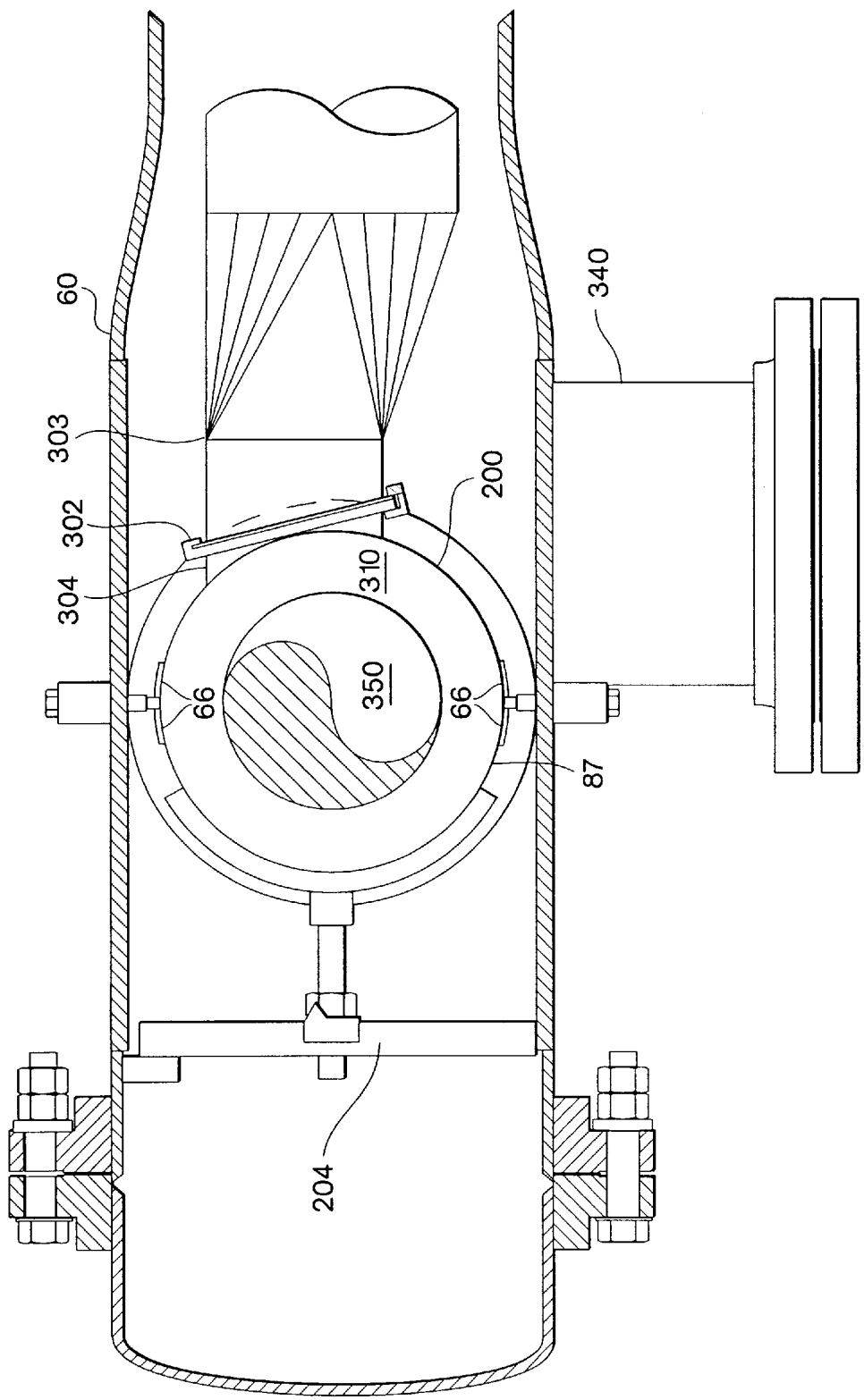
FIG. 4 is a cross-sectional view through Section DD of FIG. 3.

FIG. 4 shows a section at D—D FIG. 3 of the transition from the circular piping to the rectangular outlet 303 through passageway 302 where hot air enters the inner casing 200 air passageway 310 which eventually passes through holes 91, 94 and the holes in the combustion liner 86 not shown into the liners 86 and 87 to gas passageway 350. A pipe and flange arrangement 340 allows access to another section of the turbine control valve for working access to the inner flanged liner connection 302 and 304.

Figure 8:
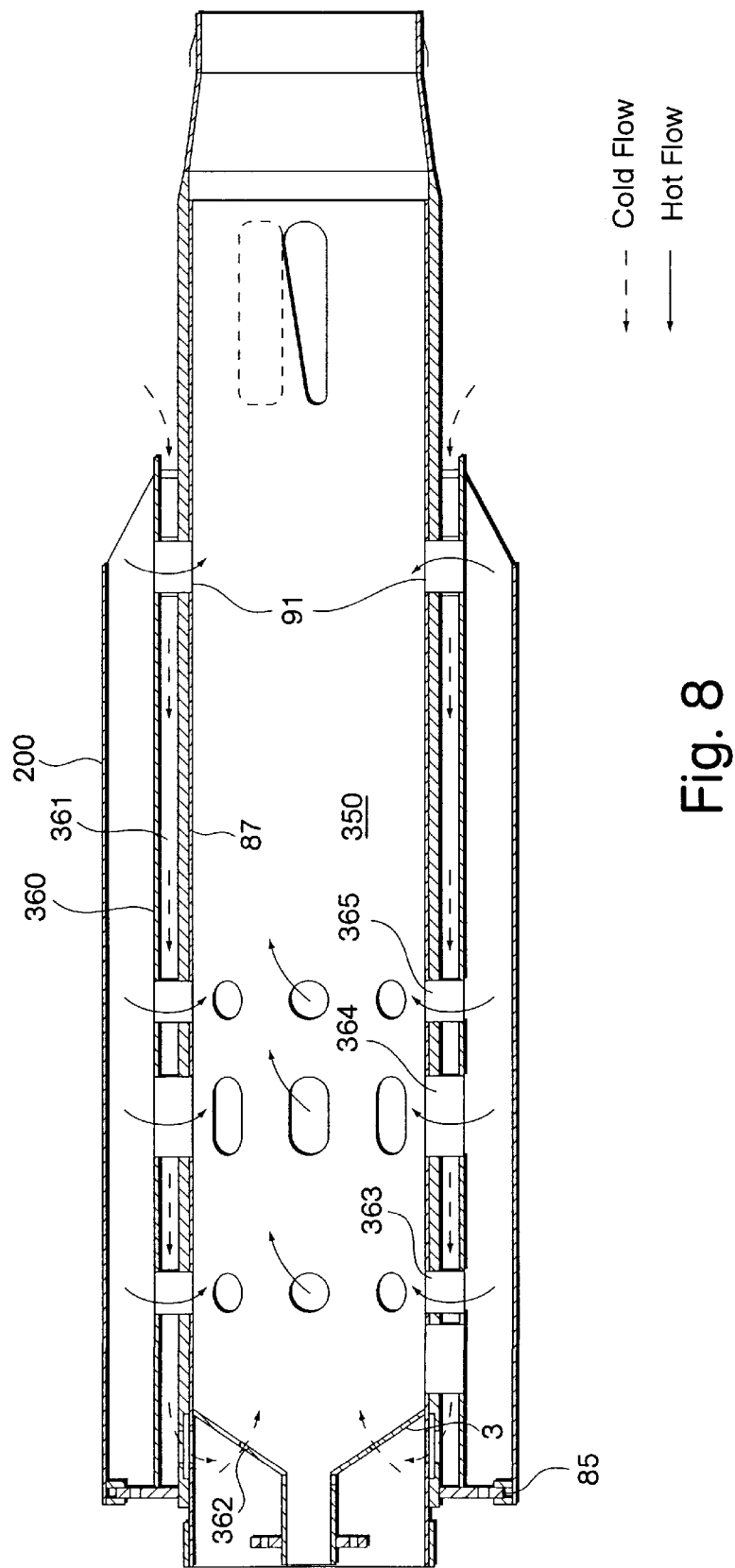
FIG. 8 is a partially semi-diagrammatic cross-sectional view through an alternate embodiment showing a cooling outer liner for the turbine control valve of this invention.

In an alternate embodiment of this invention shown in FIG. 8, provision is made for extra cooling of the turbine control valve which may be required under higher operational temperatures in order to protect the metallic parts of the valve. In this embodiment, all components are as illustrated in FIG. 3, except that an extra cooling air passage 361 is added. In this embodiment, between the inner casing 200 and the liner is interposed a tube 360 which forms an annular passageway 361 between the liner 87 and the tube 360. A series of holes 362 are provided to allow cool air flow from inlet 22 to cool the liner 87 which would otherwise be exposed to hot air flow on both the inside and outside surfaces and thus by this means the liner is lowered in temperature during normal operation. The flow through annular passageway 361 allows a passageway to the inner passageway 350 through a series of holes 362 which may be 8 in number equally spaced about the diameter of the combustor cone-shaped element 3 generally referred to as the cap. A small amount of cool air, 5 to 10 percent of the flow at 22, is provided for cooling 87. The main flow of hot air axially along axis 190 remains heated to the temperature coming from the air heater that is in the range of from 1500° F. to 2800° F. The annular tube 360 is in a fixed in angular and axial position on flange 85 and remains centered on 87. Hot air flow from the heat exchanger can pass into the passageway 350 through openings 363, 364, 365 and 91 positioned about the liner 87 uniformly as, for example, 8 holes of a size similar to the size of openings 91 uniformly spaced about the 360° circumference of the liner.

The arrows show hot and cold air passage through the turbine control valve as best seen in FIG. 3. The dashed arrows show cold air flow while the full line arrows show hot air flow. Cold air admixing is accomplished within the axially extending passageway 350 adjacent and downstream from openings 90 in the turbine control valve sleeve. Note that within the passageway 350 heated and cool air are intermixed at the area below holes 90 as will be described.

The inlet 23 FIG. 3 of the turbine expander has controlled heated air entering from the TCV. Mixing is accomplished downstream from the turbine control valve sleeve in the axial extending gas mixing passageway 350 of the TCV by the plurality of first openings 90. The cool air inlet 22 brings cool air from the compressor section of the turbine (the air is cool relative to the air heated by the air heater 102 FIG. 2). Heated air from the air heater enters at 21 as previously described. An outlet 100 FIG. 3 acts as a first outlet for passing mixed heated and cool air to the turbine expander at 23. The liner 87 can be movably mounted with respect to the sleeve 202 such that the opening in the liner and the sleeve can be aligned as required, to mix in variable proportions of cool air in the cool air inlet with heated air from the heated air inlet to regulate the turbine expander inlet gas temperature at 23 to provide an optimum predetermined, temperature profile to the outlet 100 and subsequently to the turbine inlet.

In the preferred embodiments of this invention, the cool air inlet temperature is between about 200° F. and 1200° F. and the heated air inlet temperature is between about 1500° F. and 2800° F. Preferably the cool air inlet temperature is from about 450° F. to 850° F. and the heated air inlet is from about 1700° F. to 2500° F. Pressure produced by the compressor section 14 of the gas turbine provides a pressure of from 60 to 600 psia at the inlet 22. However, the heated air at 21 coming from the air heater 102 is at a lower pressure than 22, and in addition, there is a pressure drop caused by the hot air from the air heater passing through the openings at 362, 363, 364, 365 and 91 so that the heated air in liner 87 has a total pressure of from 2 to 10% below that of the pressure leaving the compressor 14 and entering at inlet 22. The pressure difference provides the energy needed for mixing the cold and the hot air to obtain the desired optimum temperature profile at the turbine expander. Thus, the heated air shown by the arrows enters at inlet 21 and passes through the annular passages 310 as shown then through 363, 364, 365 and 91 is mixed with the cold air through 90 through 350 to the turbine expander inlet. Note that flow of air passed through the supplementary combustor holes 94 shown in FIG. 3 has passed through the air heater. Whereas in FIG. 8 this air entering 87 through 362 would serve first as cooling air for 87 and does not pass through the turbine air heater first. Holes 91 provide for a supplementary area of flow through 87 when 90 is closed to reduce pressure drop at maximum operating temperature from the air heater. This air flow is at a pressure below that of the pressure of the cool air entering at inlet 22. Preferably, the pressure difference is in the range of from 2–10 percent below the pressure of the cooler gas entering at 22.

The cool air is entering at 22 as seen by the arrows is separated from the heated air within the temperature control valve and is intermixed only through holes 90 when the sleeve and liner are rotated so as to open partially or wholly a passageway formed by holes 90 in the liner and 90a in the sleeve as will be further described. When these holes are opened to provide a passageway to the inner passageway 350, because of the pressure drop, the air entering through the circularly arranged holes 90–90a will have a jet action being drawn into the passageway 350 by the pressure difference which causes uniform efficient, rapid mixing of the heated and cooled air which then passes towards the outlet 100 and turbine expander connection at 23. The holes 90, 90a when aligned in forming partial or wholly opened passageway causes a jet like action of the cold air into the moving stream of heated air. At full load of the turbine, it is preferred to keep the temperature constant as for example at 1800° F. and this can be done by adjusting the air passing through openings 90–90a by the use of valve rotation of actuator 74. With the mass flow and pressure essentially constant the temperature at 23 determines the turbine power output with an increase of temperature giving increased energy and an increase in rotational speed which increases the load when driving centrifugal compressors alternators or the like. The temperature can be changed to vary the rotational speed thus vary the output.

Figure 5:
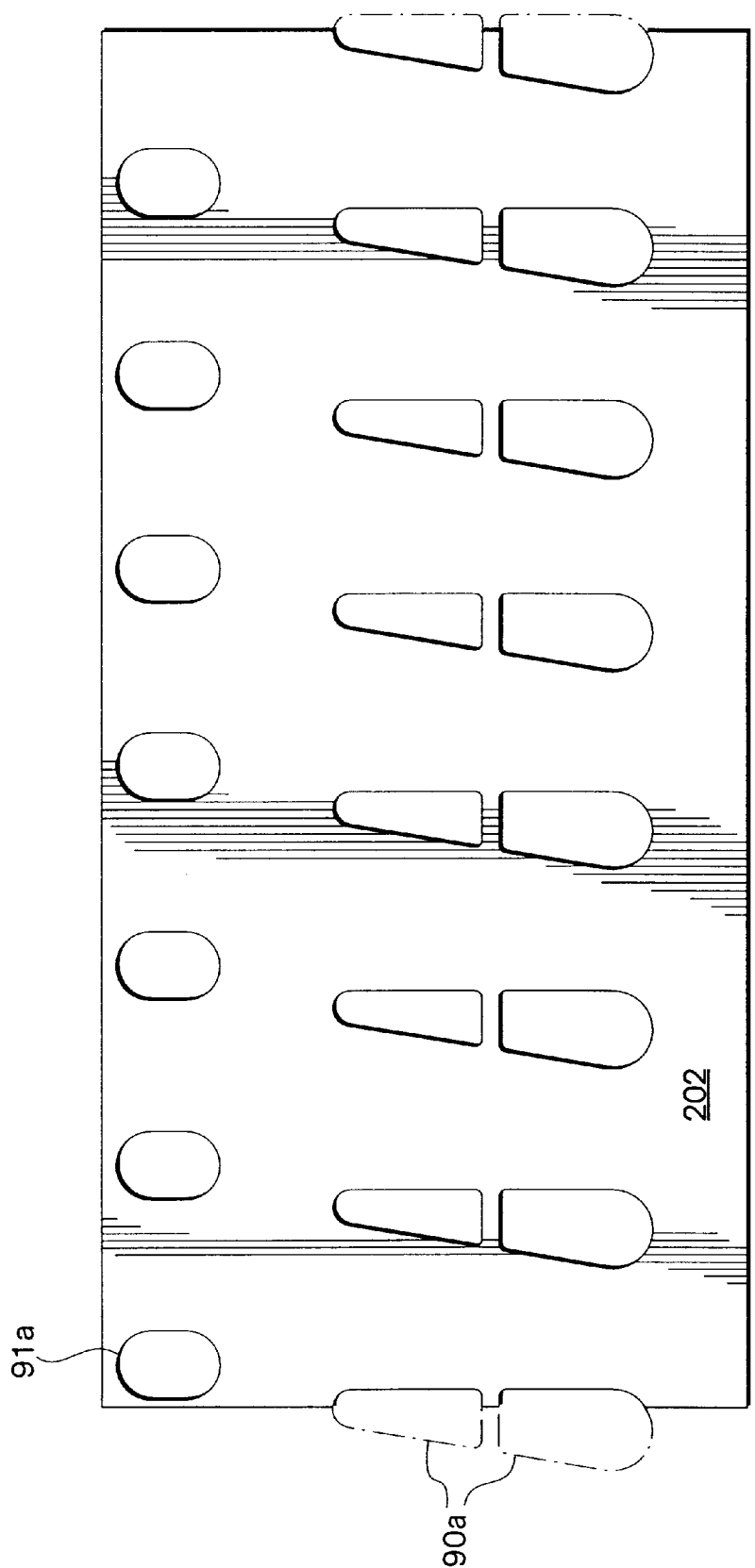
FIG. 5 is a semidiagramatic expanded and flattened view of a cylindrical air flow control sleeve.
Figure 6:
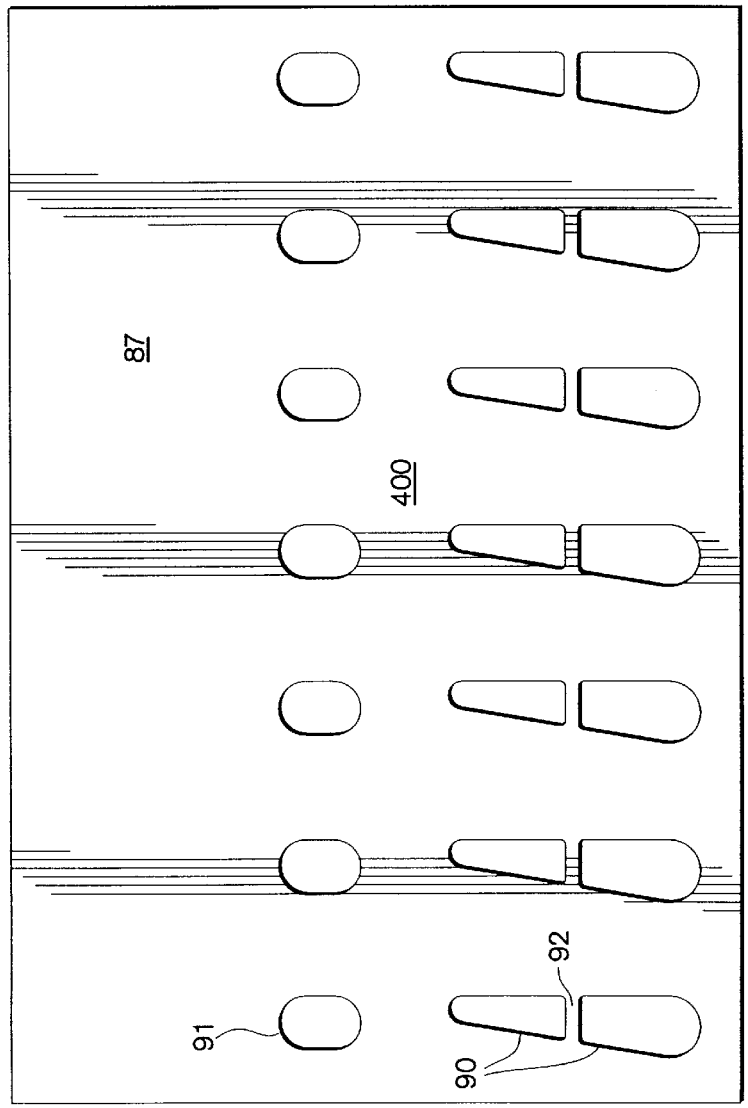
FIG. 6 is an expanded and flattened view of a cylindrical inner liner for the sleeve shown in FIG. 5.
Figure 7:
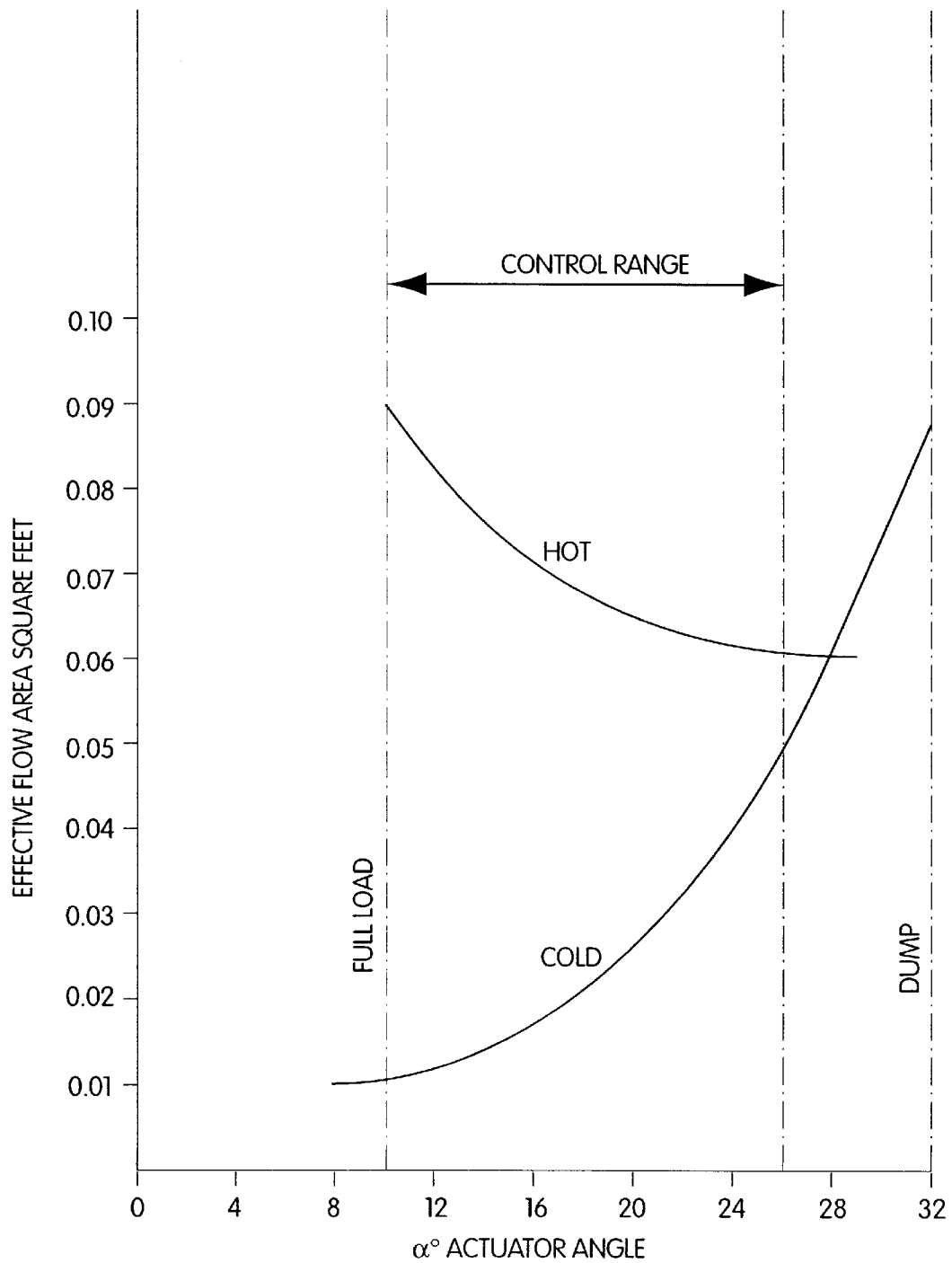
FIG. 7 is a flow performance curve of the turbine control valve of this invention showing the effective flow area corresponding to degrees of rotation of the liner with respect to the sleeve, i.e. cold air and heated air flows areas. The graph lines shown illustrate the area of the openings of the cold and hot openings of the valve.

Turning now to Table A, Table B and FIGS. 5, 6 and 7, the function of the openings 90 and 90a are discussed.

FIGS. 5 and 6 are expanded views of the openings 90, 90a respectively, as well as 91 and 91a, i.e., the cylindrical tubes or pipes are opened at a line parallel to the axis of each cylindrical tube and laid out in flat form so that the interrelationship of the openings which close or open to allow mixing of hot and cool gas can be more easily described. Table A shows the turbine control valve (TCV) areas of holes for one embodiment. Thus, the center line 400 is illustrated in FIG. 6 to correspond with aligned lines for each degree of rotation of the tubular members of the liner 87 and sleeve 202. Thus, when line 400 is coaxial with the line shown at 32°, the valve is at a dump position where the holes 90, 90a are wide open and the holes 91 and 91a are closed, allowing maximum flow of cool air by closing the holes 91 and 91a the hot air 21 flow area is reduced increasing the resistance to flow through the air heater. This allows a sufficient flow of cool air from passageway 22 into passageway 350 to reduce the temperature of the heated gas in passageway 350 below a temperature at which the turbine can continue to operate. As the sleeve is rotated to the lines indicated at 27°, 25°, 23°, 21 °, 19° and 17°, the area for passage of heated air through holes 91, 91a varies as shown in Table A to increase the hot air flow and for 90 and 90a to decrease cool air flow into the passageway 350 and provide for the desired operating temperatures of gas flow at 100, to the gas turbine inlet 23, providing for the gas turbine to increase power or load. FIG. 7 again notes the degree of rotation which corresponds to the area opening of the holes to permit cool air flow to the central passageway and thus varying the temperature of the gas flow to the turbine expander. In FIG. 7 effective flow area is shown at different degrees of rotation. Rotation can be accomplished as desired by use of the rotational actuator previously described as known in the art. In the embodiment shown an angular rotation about the central axis of from 0 to 32° is all that is used. However, with different hole patterns and sizes, different degrees of rotation can be used if for example 90°, 120° or more. Similarly an axially actuated valve could be used in place of a rotational solution which was preferred for the first embodiment.

Table B further discloses the mode of operation of the turbine and degree of rotation as shown in Table A and in FIGS. 5 and 6.

The effective flow area of FIG. 7 takes into effect an adjustment for the difference between actual flow area and effective flow area which is the coefficient of discharge through the openings 90, 90a, 91, 91a, as known in the art. Note that Table A shows that as the open area of holes 90 increase the open area of holes 91 decrease with rotation. This feature maintains the pressure needed to provide control over the gas turbine throughout the operating range and would vary depending on the type of gas turbine used.

In the preferred embodiment of this invention, passageway 350 has an overall diameter of approximately 6 inches, inner casing 200 has a diameter of approximately 9 inches and outer casing 60 has a diameter at each of its 4 sections of approximately 12 inches. Flange 70 to flange 212 is a distance of approximately 30 inches and flange 208 to flange 51 is a distance of 25 inches. The annular passageway 315 has an outer diameter of 10 inches and an inner diameter of about 6 inches.

The inner liner 87 has a thickness of 0.06 inches, a length of 30 inches and is made of Atek. The pressure drops are as described above with preferably a pressure of about 5 percent difference between the inner passageway pressure 350 and the cool air pressure entering at 22.

The turbine that can be connected to the TCV can be a Garrett Model 951 by Garrett Air Research Corporation of Phoenix, Ariz. and has an air flow of 3·6 kg/sec (7·92 lbs/sec). In all cases where flanges are shown with bolts shown, standard number of bolts is for example 6–8 can be cylindrically arranged around the flanges to provide a gas tight seal at all seals where required as noted in the art.

While specific embodiments has been mentioned and been shown and described, many variations are possible. For example, various linear actuators can be used rather than rotary actuators is desired, the rotation of the liner is preferred within the sleeve with a good seal between the liner and the sleeve due to their close fit. Thus the outer diameter of the liner is preferably spaced about 0.01 of an inch radially from the inner diameter of the sleeve in order to provide for good sealing when the openings 90, 90*a* and 91, 91*a* respectively are aligned. However, in some cases, the sleeve can rotate and the liner can be stationary. In some cases, an axial motion can be used rather than a rotary motion to provide variation in the openings 90, 90*a*, 91 and 91*a*. It is preferred that the sleeve and liner be encircling and circular, although other encircling means can be used. The encircling nature of the sleeve and liner provides for uniform mixing about 360° of the axis and is preferred for use in this invention. Although teardrop and oblong openings have been shown, the shape of the openings can vary greatly as desired, taking into account the area of opening and the discharge coefficient with respect to gas flows of the heated and cold air.

Figure 9:
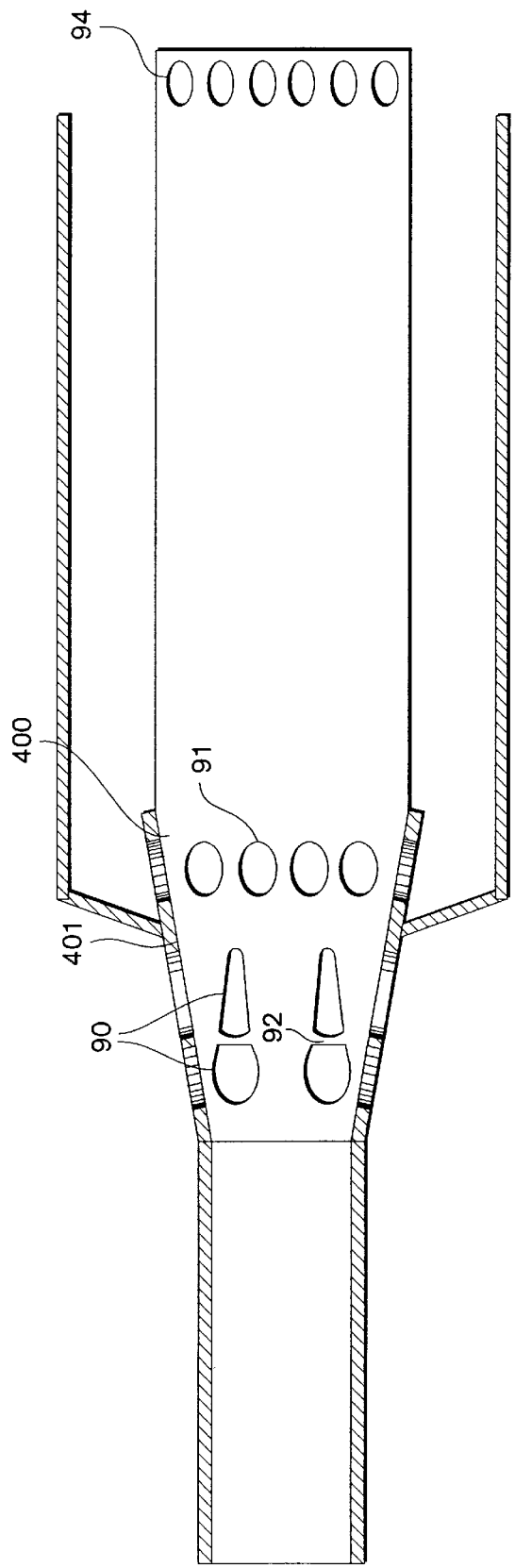
FIG. 9 is a semi-diagrammatic view of an alternate embodiment of a liner and sleeve arrangement for use in another embodiment of this invention.

FIG. 9 shows a frustroconical liner 400 and corresponding sleeve 401 corresponding generally to the liner 87 and sleeve 202 of FIG. 3. These frustroconical membranes can be urged against each other by a spring arrangement not shown to form good sealing action at the openings accommodating differential expansion under operating conditions to alleviate gas leakage. Thus, the liner 400 and sleeve 401 can be used to replace the liner 87 and sleeve 202 of FIG. 3 with suitable modification of design and mounting elements to urge the liner and sleeve together.

The cylinder and sleeve arrangement with aligned openings, while preferably cylindrical or having openings equally spaced about a central axis, can be in other forms if desired. In the preferred embodiment, the sleeve is rigid with respect to the liner which is flexible. The flexibility of the sleeve adapts to distortion in the liner due to differential thermal expansion. Since there is a small tolerance in the outer diameter of the liner and inner diameter of the sleeve preferably with a modest clearance of from 0.001 to 0.020 inch, gas leakage, when the openings are aligned or out of alignment, will be extremely small. Flexibility of the liner allows rotation without hangup and binding of the liner within the sleeve at a variation in temperature gradients within the valve. It is preferable to use materials having low thermal coefficients of expansion to fabricate the valve lining 87 and sleeve 202 so that a minimum radial clearance between the two can be employed without the risk of binding due to differential heating or uneven heating.

The material of the sleeve, or other parts of the TCV can be known high temperature ceramics, alumina, fiber reinforced silicon carbide or the like materials such as corrosion-resistant alloys including high strength nickel-based corrosion-resistant alloys.

It is a feature of this invention that in one embodiment one can introduce a minimum pressure drop in the gas turbine cycle so as to maintain optimum efficiency. The valve pressure drop is used to provide for mixing of the cold compressed air with the hot air flow from the turbine air heater. The invention can provide for minimum uncontrolled leakage of cold air into hot air flow to reduce the maximum air temperature needed from the turbine air heater to attain full load.

TABLE A

| TCV Areas | Open (Inches$^2$)Holes | | |
|---|---|---|---|
| Position | COLD 90 | 91 | HOT |
| 0° (Start-Up & Oper) | 0 | 0 | |
| 15° (Max Load) | 0.973 | 8.995 | |
| 17° | 2.401 | 7.826 | |
| 19° | 4.207 | 6.664 | |
| 21° | 6.636 | 5.516 | |
| 23° | 9.574 | 4.410 | |
| 25° | 13.069 | 3.346 | |
| 27° (Min Load) | 16.597 | 2.331 | |
| 32° (Dump or Shut-Down) | 25.494 | 0 | |
| 90 Holes Teardrop 7 Holes | | | |
| 91 Holes 1 × 1½ 7-Holes | | | |

TABLE B

OPERATING MODES OF THE TCV

| Mode of Operation Status of Cycle | Combustion in Chamber 104 Not Operating, Supplementary Combuster Operating | | Transition Operating on Primary 104a | Indirect Fired Operation When Air Heater is at Operating Temp. No supplementary fuel at supplementary combustor is needed | | |
|---|---|---|---|---|---|---|
| | Starting | Acceleration to Self-Sustaining | & Supplementary Combustor | Minimum Load | Full Load | Shut-Down or Dump |
| Fuel Used & Cob. Used | Supplementary | Supplementary | Supplementary and Primary (104) | Primary (104) | Primary (104) | Primary (104) |
| Air Heater Temp. | Cold | 600–1100F. | 600 to 1800F. | 1500 to 1800F. | 3200F. | Max to Moderate to cold |
| TCV Angle Position* | 0° | 0° | 14–27° | 27° | 10–12° | 32° |

TABLE B-continued

OPERATING MODES OF THE TCV

| Mode of Operation Status of Cycle | Combustion in Chamber 104 Not Operating, Supplementary Combuster Operating | | Transition Operating on Primary 104a & Supplementary Combustor | Indirect Fired Operation When Air Heater is at Operating Temp. No supplementary fuel at supplementary combustor is needed | | Shut-Down or Dump |
|---|---|---|---|---|---|---|
| | Starting | Acceleration to Self-Sustaining | | Minimum Load | Full Load | |
| (Nominal Part B | closed | closed | modulating | modulating 23–27° | modulating 10–20° | open |
| Port C | closed | closed | modulating | modulating 23–27° | modulating 10–20° | closed |
| Supplementary Combustor Liner Flow Area | open | open | open | open | open | open |

Fuels: Supplementary fuel is a refined fuel or natural gas; Primary fuel is an ash bearing fuel such as coal, lignite, residual oil
*Assumes - max air heater exit temperature

We claim:

1. A turbine control valve for regulating the inlet gas temperature of a combustion gas turbine expander, said valve comprising:
   a liner having a plurality of first openings and a gas mixing passageway;
   a sleeve, positioned around said liner, having a plurality of second openings corresponding to said first openings in said liner;
   a cool air inlet;
   a heated air inlet; and,
   a first outlet for passing mixed heated and cool air to a turbine expander inlet, wherein said liner is moveably mounted with respect to said sleeve such that said openings in said liner and said sleeve can be aligned as required, to mix and proportion cool air from said cool air inlet with heated air from said heated air inlet to regulate said turbine expander inlet gas temperature to provide a predetermined, temperature profile to said first outlet.

2. The turbine control valve as claimed in claim 1, further comprising said sleeve being rigid and said liner being flexible so that the liner adapts to distortions in the sleeve caused by differential thermal expansion so as to prevent binding of said sleeve and liner when they are moved with respect to each other to cause said alignment of said first and second opening to vary to provide adjusted temperature of air at said third outlet.

3. The turbine control valve as claimed in claim 2, wherein said sleeve and liner are encircling and axial aligned.

4. The turbine control valve as claimed in claim 3, wherein said cool air inlet temperature is between about 400° F. and about 1200° F.

5. The turbine control valve as claimed in claim 4, wherein said heated air inlet temperature is between about 1,500° F. and about 2,800° F.

6. The turbine control valve as claimed in claim 5, wherein said turbine expander inlet temperature is between about 800° F. and about 2,750° F.

7. The turbine control valve as claimed in claim 1, wherein said valve comprises a material having good mechanical strength, temperature resistance, oxidation resistance, and low thermal coefficient of expansion.

8. The turbine control valve as claimed in claim 7, wherein said material is selected from the group consisting of a high strength, nickel-based corrosion-resistant alloy, ceramic composite materials, and alumina fiber reinforced silicon carbide.

9. The turbine control valve as claimed in claim 2, further comprising means for controlling said liner to provide rotation with respect to said sleeve.

10. The turbine control valve as claimed in claim 9, wherein said liner rotation is controlled between about 0° and 32°.

11. The turbine control valve as claimed in claim 9, wherein said plurality of openings in said liner and said sleeve are aligned to allow passage of said cool air to said turbine inlet.

12. The turbine control valve as claimed in claim 1, wherein said plurality of openings in said liner and said sleeve are aligned to allow passage of said cool air and said heated air to said turbine inlet when said liner is rotated less than about 32°, said cool air and heated air being uniformly admixed with the aid of a pressure differential between said cool air and said heated air.

13. The turbine control valve as claimed in claim 9, wherein said plurality of openings in said liner and said sleeve are aligned to allow passage of said cooler air to said turbine inlet when said liner is rotated about 32°.

14. The turbine control valve as claimed in claim 10, wherein said liner rotation between about 0° and about 32° has a full stroke period of between about 10 and about 100 ms.

15. The turbine control valve as claimed in claim 14, wherein said full stroke period is between about 10 and about 40 ms.

16. The turbine control valve as claimed in claim 1, wherein said sleeve is coaxially positioned around said liner and a radial clearance between them is from 0.001 to 0.020 inches.

17. The turbine control valve of claim 16, wherein said sleeve and liner are both cylindrical.

18. The turbine control valve of claim 16 wherein said sleeve and liner are frustroconical.

19. The turbine control valve as claimed in claim 2, further comprising a second sleeve, positioned around said rigid sleeve, defining a space between said sleeves for the passage of said cool air.

20. In an externally fired combustion cycle having a gas turbine with a compressor portion and a turbine expander portion, a heat exchanger and a load, the improvement comprising:
   a liner having a plurality of first openings and gas mixture passageway;
   a sleeve, positioned around said liner, having a plurality of second openings corresponding to said first openings in said liner;

a cool air inlet;

a heated air inlet;

a supplementary fuel combustor;

a first outlet for passing said cool air out of said valve as to a heater and first and said second openings permitting passing cool air internally of said liner into said passageway;

a second outlet for passing heated air to said passageway; and a first outlet for passing mixed heated and cool air to a turbine expander inlet, wherein said liner is moveable within said sleeve such that said openings in said liner and said sleeve can be aligned as required, to mix and proportion cool air from said cool air inlet with heated air from said heated air inlet to regulate said turbine expander inlet temperature to provide a predetermined, average temperature and temperature profile to said third outlet.

21. A method of varying the inlet air temperature to the expander portion of a gas turbine by providing a turbine control valve;

providing a first cool air source at a first temperature in a range of from 400° to 1200° F., a first pressure in a range of from 60 psig to 600 psig.;

a second heated air source at a second temperature in the range of from 1500° F. to 2800° F. and a second pressure in the range from 50 to 570 psig;

maintaining a higher pressure in cool air provided by said cool air source, then the pressure of the heated air provided from said heated air source;

intermixing said cool air and heated air by the use of a pressure drop between the two to obtain rapid, efficient and uniform mixing to form a combined air stream having a predetermined average temperature and temperature profile and passing said combined air stream with said predetermined average temperature to a turbine expander while modulating gas stream mixing to maintain the desired turbine power output, but providing for an increase or decrease in average temperature to increase or decrease power output from said turbine expander to accommodate a desired level.

22. A method in accordance with the method of claim 21, wherein said turbine is maintained at a constant speed and essentially constant mass flow and constant pressure while said turbine inlet air temperature can vary to allow for varying the load on the turbine, said gas turbine temperature being maintained constant by a adjusting the proportion of heated air to cool air by the use of a sleeve having a liner with said sleeve and liner having aligned openings capable of being moved to fully open positions, fully closed positions and intermediate positions whereby the ratio of heated air to cold air can be adjusted using a pressure differential between the heated and cooled air to uniformly and rapidly mix.

23. A method according to claim 22 wherein said intermediate positions of said sleeve and liner maintain a desired pressure drop in said turbine control valve.

* * * * *